US010658934B2

(12) United States Patent
Finkel et al.

(10) Patent No.: US 10,658,934 B2
(45) Date of Patent: May 19, 2020

(54) QUASI-RESONANT CONVERTER WITH EFFICIENT LIGHT-LOAD OPERATION AND METHOD THEREFOR

(71) Applicant: SEMICONDUCTOR COMPONENTS INDUSTRIES, LLC, Phoenix, AZ (US)

(72) Inventors: Alan David Finkel, Chandler, AZ (US); Armando Gabriel Mesa, Tempe, AZ (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/982,965

(22) Filed: May 17, 2018

(65) Prior Publication Data

US 2018/0351464 A1    Dec. 6, 2018

Related U.S. Application Data

(60) Provisional application No. 62/515,959, filed on Jun. 6, 2017.

(51) Int. Cl.
*H02M 3/335* (2006.01)
*H02M 1/08* (2006.01)
*H02M 1/00* (2006.01)

(52) U.S. Cl.
CPC ......... *H02M 3/33523* (2013.01); *H02M 1/08* (2013.01); *H02M 3/33507* (2013.01);
(Continued)

(58) Field of Classification Search
CPC .............. H02M 3/33523; H02M 1/08; H02M 2001/0009; H02M 2001/0048;
(Continued)

(56) References Cited

U.S. PATENT DOCUMENTS

2008/0130324 A1* 6/2008 Choi ................. H02M 3/33507
363/21.03
2010/0302812 A1* 12/2010 Moon ............... H02M 3/33507
363/21.01
(Continued)

OTHER PUBLICATIONS

NCP1339, "High-Voltage, Quasi-Resonant Controller featuring Valley Lock-Out and Power Saving Mode," Product Data Sheet, Semiconductor Components Industries, LLC, Aug. 2015, 31 pages, NCP1339/D Rev. 3, Semiconductor Components Industries, LLC, P.O. Box 5163, Denver, Colorado 80217 United States.

(Continued)

*Primary Examiner* — Gustavo A Rosario-Benitez
(74) *Attorney, Agent, or Firm* — Polansky & Associates, P.L.L.C.; Paul J. Polansky

(57) ABSTRACT

A switched mode power supply controller includes a latch having an output for providing a drive signal, an off-time control circuit operating in valley switching and frequency reduction modes controlling an off-time of the latch based on at least a zero current detect signal, and an on-time control circuit resetting the latch in response to a current sense signal exceeding a feedback voltage representative of a load and to the current sense signal exceeding a modulated peak current threshold value. The on-time control circuit resets the latch in response to a current sense signal exceeding a feedback voltage representative of a load and to the current sense signal exceeding a peak current threshold value. In the frequency reduction mode, the on-time control circuit modulates the peak current threshold value by increasing the peak current threshold value by a predetermined amount.

21 Claims, 8 Drawing Sheets

(52) U.S. Cl.
CPC ............... *H02M 2001/0009* (2013.01); *H02M 2001/0025* (2013.01); *H02M 2001/0032* (2013.01); *H02M 2001/0048* (2013.01); *H02M 2001/0058* (2013.01)

(58) Field of Classification Search
CPC . H02M 2001/0025; H02M 2007/4815; H02M 2001/0032; H02M 2001/0054; H02M 2001/0058; H02M 1/083; H02M 3/335; H02M 3/33507; H02M 3/3353; H02M 3/33538; H02M 3/33546; H02M 3/33553; H02J 50/12
See application file for complete search history.

(56) References Cited

U.S. PATENT DOCUMENTS

| | | | | |
|---|---|---|---|---|
| 2011/0007526 | A1* | 1/2011 | Zhang | H02M 3/1563 363/21.02 |
| 2015/0117066 | A1* | 4/2015 | Schmid | H02M 3/33523 363/21.01 |
| 2015/0311778 | A1* | 10/2015 | Chang | H02M 1/143 363/21.16 |
| 2017/0054374 | A1* | 2/2017 | Fang | H02M 3/33523 |
| 2017/0063241 | A1* | 3/2017 | Yang | H02M 3/33507 |
| 2017/0366090 | A1* | 12/2017 | Sugawara | H02M 3/158 |
| 2018/0301975 | A1* | 10/2018 | Lin | H02M 1/083 |

OTHER PUBLICATIONS

NCP1340, "High-Voltage, Quasi-Resonant, Controller Featuring Valley Lock-Out Switching," Product Data Sheet, Semiconductor Components Industries, LLC, Mar. 2016, 32 pages, NCP1340/D Rev. P0, Semiconductor Components Industries, LLC, P.O. Box 5163, Denver, Colorado 80217 United States.

NCP1937, "Combination Power Factor Correction and Quasi-Resonant Flyback Controllers for Adapters," Product Data Sheet, Semiconductor Components Industries, LLC, Jun. 2015, 38 pages, NCP1937/D Rev. 4, Semiconductor Components Industries, LLC, P.O. Box 5163, Denver, Colorado 80217 United States.

* cited by examiner

US 10,658,934 B2

QUASI-RESONANT CONVERTER WITH EFFICIENT LIGHT-LOAD OPERATION AND METHOD THEREFOR

FIELD OF THE DISCLOSURE

The present disclosure relates generally to power conversion circuits, and more particularly to quasi-resonant converters.

BACKGROUND

Switched mode power supplies can be used to create a direct current (DC) voltage from an alternating current (AC) voltage by switching current through an energy storage element such as a transformer. The duty cycle of the switching is controlled to regulate the output voltage to a desired level. Switched mode power supplies are generally efficient at heavier loads but less efficient at lighter loads. Two popular types of isolated switched mode power supplies are forward mode and flyback mode converters.

Flyback converters are common in AC voltage to DC voltage applications. A flyback converter is based on a flyback transformer that alternately builds up flux in the magnetic core and transfers energy to the output. When current is switched through the primary winding, the primary current in the transformer increases, storing energy within the transformer. When the switch is opened, the primary current in the transformer drops, inducing a voltage on the secondary winding. The secondary winding supplies current into the load. A controller varies the on- and off-times of a primary switch in series with the primary winding to regulate the output voltage to a desired level.

A quasi-resonant (QR) flyback converter is a variable switching frequency converter that detects transformer demagnetization and subsequent resonant "valleys" of the primary field effect transistor (FET) drain voltage to determine when the next switching cycle will begin. This operation is therefore a discontinuous conduction mode of operation with the added benefit that the turn-on of the primary FET is synchronized to a valley, which may reduce the power dissipation in the device during the turn-on transition. QR flyback converters may be used in off-line AC-DC consumer applications because they offer a cost effective, isolated conversion with reduced turn-on voltage of the primary FET. However known QR flyback control algorithms are less efficient at light loads, causing problems in meeting energy efficiency requirements specified by various governmental organizations.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

Figure 1:
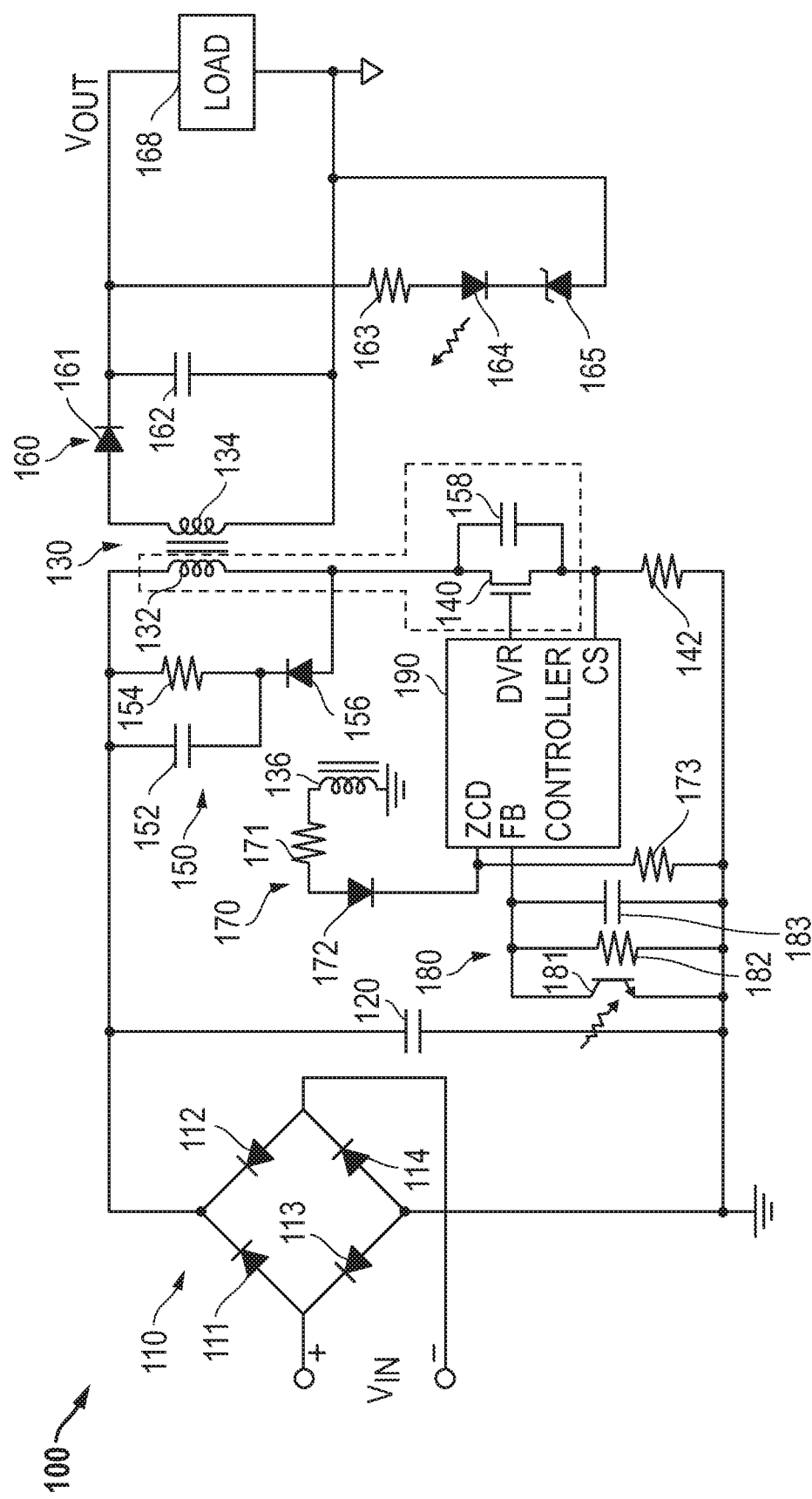
FIG. 1 illustrates in partial schematic and partial block diagram form a quasi-resonant (QR) converter with efficient light-load operation.

FIG. 1 illustrates in partial schematic and partial block diagram form a quasi-resonant (QR) converter 100 with efficient light-load operation. QR converter 100 includes generally a bridge rectifier 110, an input capacitor 120, a transformer 130, a power transistor 140, a current sense resistor 142, a snubber circuit 150, a resonant tank capacitor 158, an output circuit 160, a zero current detect (ZCD) feedback circuit 170, a voltage feedback circuit 180, and a QR controller 190.

Bridge rectifier 110 includes diodes 111, 112, 113, and 114. Diode 111 is a PN junction diode having an anode for receiving a positive component of an alternating current (AC) input voltage labeled "$V_{IN}$", and a cathode. Diode 112 is a PN junction diode having an anode for receiving a negative component of AC input voltage $V_{IN}$, and a cathode connected to the cathode of diode 111. Diode 113 is a PN junction diode having an anode connected to a primary ground, and a cathode connected to the anode of diode 111. Diode 114 is a PN junction diode having an anode connected to primary ground, and a cathode connected to the anode of diode 112.

Input capacitor 120 has a first terminal connected to the cathodes of diodes 111 and 112, and a second terminal connected to primary ground.

Transformer 130 has a primary winding 132, a secondary winding 134, and an auxiliary winding 136. Primary winding 132 has a first end connected to the cathodes of diodes 111 and 112, and a second end. Secondary winding 134 has a first end, and a second end connected to a secondary ground. Auxiliary winding 136 has a first end, and a second end connected to primary ground.

Power transistor 140 has a drain connected to the second end of primary winding 132, a gate, and a source. Current sense resistor 142 has a first terminal connected to the source of power transistor 140, and a second terminal connected to primary ground.

Snubber circuit 150 includes a capacitor 152, a resistor 154, and a diode 156. Capacitor 152 has a first terminal connected to the cathodes of diodes 111 and 112, and a second terminal. Resistor 154 has a first terminal connected to the cathodes of diodes 111 and 112, and a second terminal connected to the second terminal of capacitor 152. Diode 156 is a PN junction diode having an anode connected to the second end of primary winding 132, and a cathode connected to the second terminals of capacitor 152 and resistor 154. Resonant tank capacitor 158 has a first terminal connected to the second end of primary winding 132 and the drain of power transistor 140, and a second terminal connected to the source of transistor 140.

Output circuit 160 includes a diode 161, an output capacitor 162, a resistor 163, a photodiode 164, a zener diode 165, and a load 168. Diode 161 is a PN junction diode having an anode connected to the first end of secondary winding 134, and a cathode for providing an output voltage labeled "$V_{OUT}$". Output capacitor 162 has a first terminal connected to the cathode of diode 161, and a second terminal connected to ground. Resistor 163 has a first terminal connected to the cathode of diode 161 and the first terminal of output capacitor 162, and a second terminal. Photodiode 164 is a PN junction diode having an anode connected to the second terminal of resistor 163, and a cathode. Zener diode 165 has a cathode connected to the cathode of photodiode 164, and an anode connected to secondary ground. Load 168 has a first terminal connected to the cathode of diode 161, the first terminal of output capacitor 162, and the first terminal of resistor 163, and a second terminal connected to secondary ground.

ZCD feedback circuit 170 includes a resistor 171, a diode 172, and a resistor 173. Resistor 171 has a first terminal connected to the first end of auxiliary winding 136, and a second terminal. Diode 172 is a PN junction diode having an anode connected to the second terminal of resistor 171, and a cathode. Resistor 173 has a first terminal connected to the cathode of diode 172, and a second terminal connected to primary ground.

Voltage feedback circuit 180 includes a phototransistor 181, a resistor 182, and a capacitor 183. Phototransistor 181 has a collector, a base optically coupled to photodiode 164, and an emitter connected to primary ground. Resistor 182 has a first terminal connected to the collector of phototransistor 181, and a second terminal connected to primary ground. Capacitor 183 has a first terminal connected to the collector of phototransistor 181 and to the first terminal of resistor 182, and a second terminal connected to primary ground.

QR controller 190 has an input terminal labeled "ZCD" connected to the cathode of diode 172, an input terminal labeled "FB" connected to the collector of phototransistor 181, the first terminal of resistor 182, and the first terminal of capacitor 183, an input terminal labeled "CS" connected to the first terminal of current sense resistor 142, and an output terminal labeled "DRV" connected to the gate of power transistor 140.

In operation, QR converter 100 provides high efficiency AC-DC conversion with low noise by switching synchronously with the zero-crossing of the drain waveform using resonant tank capacitor 158. The resonant tank used for valley switching in a QR flyback is formed by the magnetizing inductance of primary winding 132 and a "lump" capacitance across primary transistor 140 illustrated in FIG. 1 as resonant tank capacitor 158. The "lump" capacitance includes the parasitic capacitance at the drain of transistor 140 including the transistor output capacitance (Coss) and, in some embodiments, a discrete capacitor to tune the resonance. Bridge rectifier 110 provides a full-wave rectified (haversine) waveform and input capacitor 120 smoothes the haversine to provide a smoothed haversine signal to the first end of the primary winding of transformer 130. QR controller 190 makes power transistor 140 conductive to conduct current through primary winding 132 and thereby to store energy in transformer 130. When QR controller 190 makes power transistor 140 non-conductive, it induces a voltage across secondary winding 134 and auxiliary winding 136. The voltage across secondary winding is rectified using diode 161, and drives current into load 168. Resistor 163, photodiode 164, and zener diode 165 form part of a feedback network in which photodiode 164 emits photons proportional to $V_{OUT}$ when $V_{OUT}$ is greater than the breakdown voltage of zener diode 165 and the forward cut-in voltage of photodiode 164.

ZCD feedback circuit 170 provides a ZCD signal on the ZCD pin of QR controller 190 whose magnitude is proportional to $V_{OUT}$. The ZCD signal allows QR controller 190 to identify a "valley", i.e. a low point in the output voltage waveform that corresponds to zero drain voltage, and to switch power transistor 140 ON at that point.

Voltage feedback circuit 180 develops a feedback signal on the FB pin of QR controller 190. It filters the current generated by phototransistor 181 (normally combined with photodiode 164 as an optocoupler) to provide a signal representative of $V_{OUT}$ for output voltage regulation.

QR controller 190 is an integrated circuit QR controller that provides the DRV signal to the gate of power transistor 140 using QR flyback control techniques. That is, it determines the pulse width and operating frequency of the DRV signal based on sensed current signal CS, zero current detect signal ZCD, and feedback signal FB.

Known QR controllers use control algorithms that provide high efficiency for medium- and heavy loads. However these architectures are unable to preserve the same high efficiency at medium and light loads. The available power delivery of a QR flyback is determined by Equation [1]:

$$P = \frac{1}{2} L_{PRI} I_{PK}^2 f_{SW} \quad [1]$$

in which $L_{PRI}$ is the magnetizing inductance of the transformer, $I_{PK}$ is the peak primary current in the transformer, and $f_{SW}$ is the switching frequency of the converter. As the load decreases, the switching frequency of the QR flyback converter will increase, which may reduce the converter's efficiency at medium loads.

One known QR converter responds to a light load condition by taking the converter out of QR mode, entering discontinuous conduction mode (DCM), and adding deadtime after the demagnetization phase. Using this technique, the converter switches naturally at lower and lower frequencies as the load lightens. The controller gradually reduces the frequency until it reaches a frequency safely above the audible range, such as 25 kHz, and then clamps the frequency at that level. In order to ensure frequency reduction, this converter limits the peak switch current to a minimum (or "frozen") value. However the rate of frequency reduction is limited, which prevents high frequency designs from achieving good light load efficiency.

Another known QR converter uses a low frequency voltage controlled oscillator (VCO). As the load gets lighter, this converter transitions through different valleys, until it eventually reaches the last valley at a certain level of the load. If the load lightens further, the converter begins switching synchronously with the VCO. The VCO frequency is reduced based on the level of the feedback signal. However if the frequency at the last valley is too high, then this converter design is unable to achieve high efficiency at light loads.

In embodiments of a QR controller for the QR converter of FIG. 1, the peak current is modulated to reduce the switching frequency of the QR converter. The peak current is modulated by increasing it only during a frequency reduction mode for light loads, and by reducing it as the load decreases further, ensuring that the level at which frequency reduction mode is exited remains at the desired level.

Figure 2:
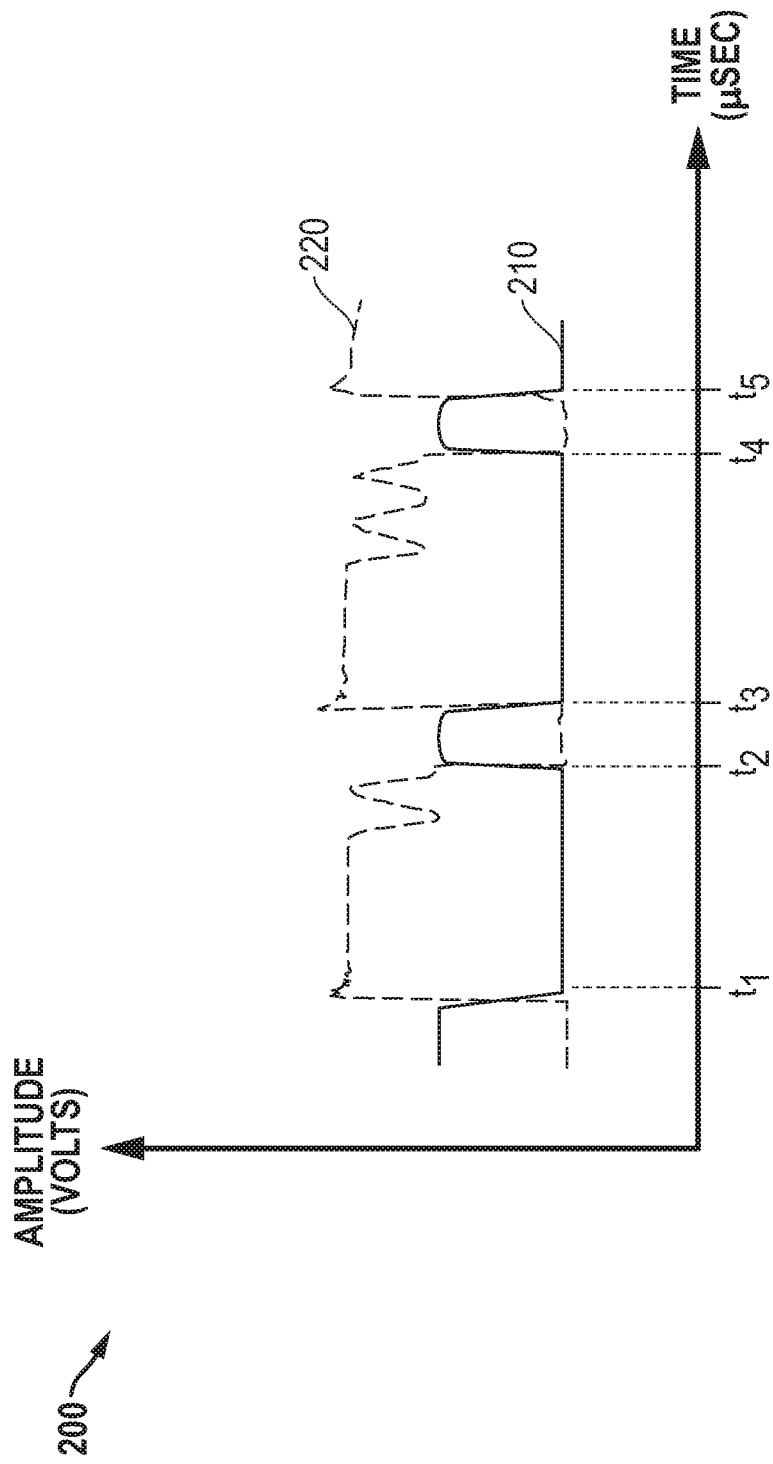
FIG. 2 illustrates a graph showing QR switching according to the prior art.

FIG. 2 illustrates a graph 200 showing QR switching according to the prior art. In graph 200, the horizontal axis represents time in microseconds (µsec), and the vertical axis represents the amplitude of two signals in volts. Graph 200 shows two waveforms of interest, including a waveform 210 showing the voltage of the DRV signal, and a waveform 220 showing the voltage of the drain signal, that is the signal at the drain of transistor 140. Graph 200 also shows five time points of interest, labeled "$t_1$", "$t_2$", "$t_3$", "$t_4$", and "$t_5$". At time $t_1$, the DRV signal transitions low, causing the power transistor 140 to become nonconductive. Initially transformer 130 causes the drain signal to go to a high voltage and remain high, but then eventually to start to oscillate. When the drain signal oscillates, QR controller 190 detects the presence of a valley at the lowest point of the waveform, indicating that power transistor 140 can be switched. Thus QR controller 190 actives the DRV signal at time $t_2$. The activation of the DRV signal makes the drain signal low. The DRV signal remains active until time $t_3$, and which point QR controller 190 deactivates the DRV signal and makes power transistor 140 non-conductive.

QR controller 190 determines the width of the DRV pulse based on current mode PWM control, and deactivates the DRV signal at time $t_3$. The drain signal transitions to a high voltage in response to the deactivation of the DRV signal, until QR controller 190 again activates the DRV signal for another pulse between times $t_4$ and $t_5$.

As shown in graph 200, at time $t_2$ QR controller 190 activates the DRV signal at a valley in the drain signal. As shown in graph 200, this switching occurs at the second valley. However QR controller 190 detects a lightening of the load, and in response changes to selecting the third valley, which it selects around time $t_4$.

Known QR converters that use this technique can switch to increasingly higher numbered valleys as the load lightens. However one of the complexities of controlling the QR flyback switching in this manner is achieving valley detection at lighter loads because the amplitude of the oscillations may reduce as the energy dissipates and the resonance dampens, making valley detection more difficult.

Figure 3:
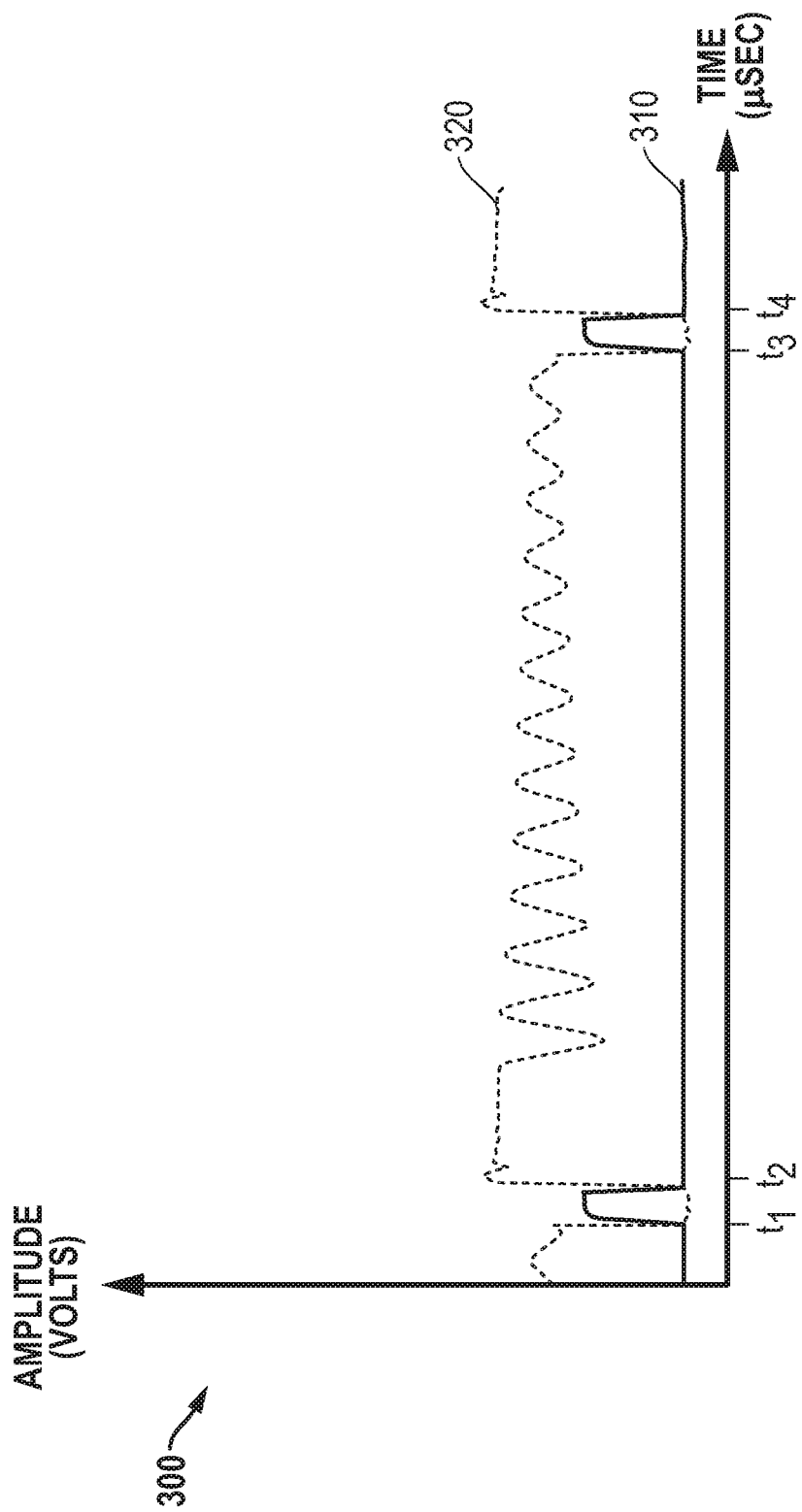
FIG. 3 illustrates a graph showing QR switching under light-load conditions according to the prior art.

FIG. 3 illustrates a graph 300 showing QR switching under light-load conditions according to the prior art. In graph 300, the horizontal axis represents time in µsec, and the vertical axis represents the amplitude of two signals in volts. Graph 300 shows two waveforms of interest, including a waveform 310 showing the voltage of the DRV signal, and a waveform 320 showing the voltage of the drain signal. Graph 300 also shows four time points of interest, $t_1$, $t_2$, $t_3$, and $t_4$. At time $t_1$, QR controller 190 activates the DRV signal, causing power transistor 140 to become conductive and making the drain signal low. Thereafter at time $t_2$, QR controller 190 de-activates the DRV signal, causing power transistor 140 to become nonconductive and causing the drain signal to go to a high voltage and remain high for some period of time, but eventually to start to oscillate. Graph 300 shows the operation of QR controller 190 under extremely light-load conditions, and it selects the thirteenth valley before again switching the DRV signal high between times $t_3$ and $t_4$. However because the magnitude of the oscillations dampens over time, it is difficult to detect higher and higher numbered valleys.

Because of these problems, known QR flyback converters may transition to another mode of operation, such as a frequency-controlled operating mode. In the frequency-controlled operating mode, a subsequent switching cycle may be initiated after a fixed off-time period rather than by being synchronized to a resonant valley. In this way, known QR controllers reduce or "fold back" the effective switching frequency as the load lightens beyond the ability to discriminate the valleys.

Figure 4:
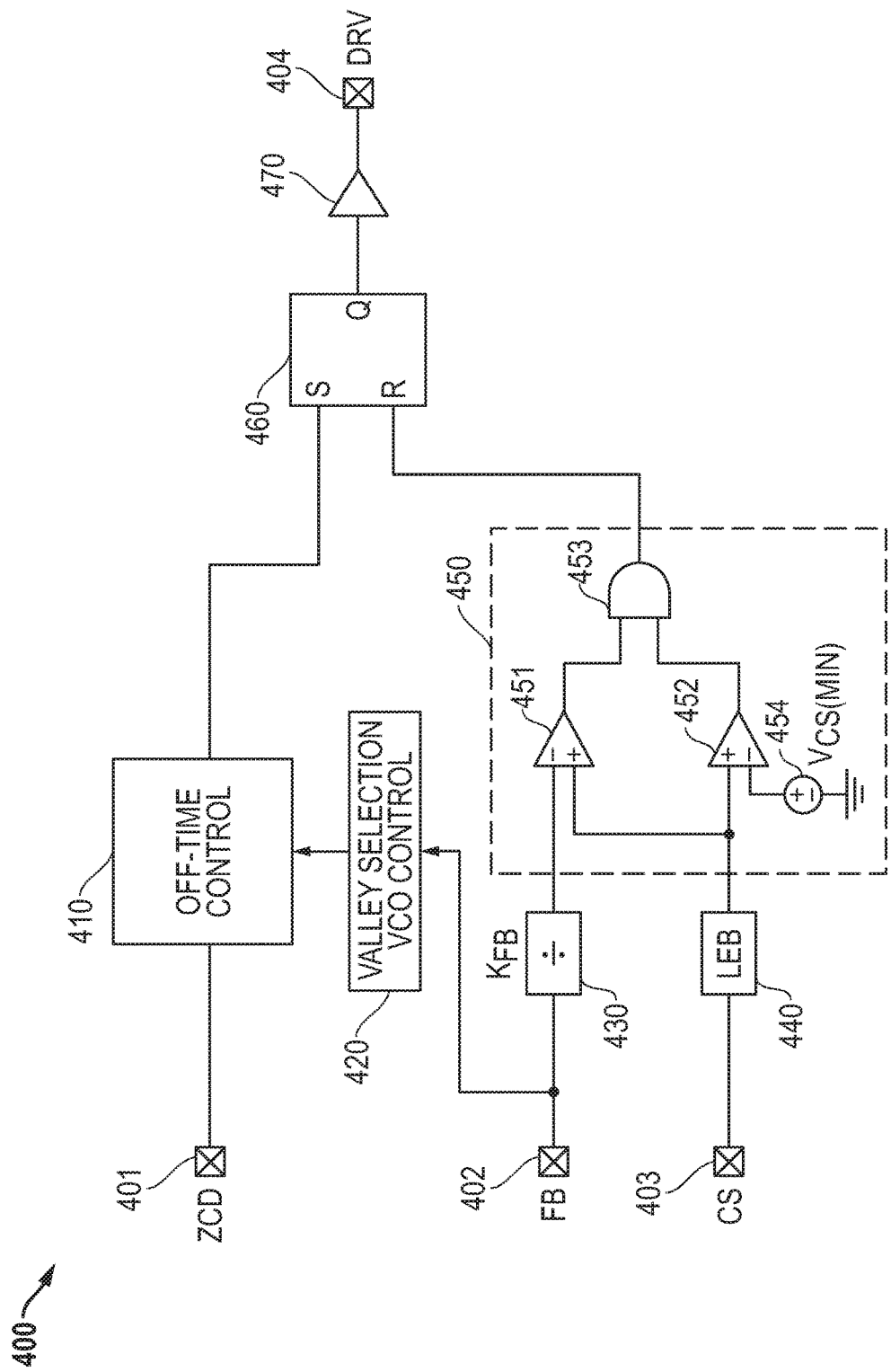
FIG. 4 illustrates in block diagram form a QR controller according to the prior art.

FIG. 4 illustrates in block diagram form a QR controller 400 according to the prior art. QR controller 400 includes an integrated circuit terminal 401, an integrated circuit terminal 402, an integrated circuit terminal 403, an integrated circuit terminal 404, an off-time control circuit 410, a valley selection and voltage controlled oscillator (VCO) control circuit 420, a feedback divider circuit 430, a leading edge blanking (LEB) circuit 440, an on-time control circuit 450, an SR latch 460, and a driver 470.

Integrated circuit terminal 401 is an input terminal for receiving the ZCD signal. Integrated circuit terminal 402 is an input terminal for receiving the FB signal. Integrated circuit terminal 403 is an input terminal for receiving the CS signal. Integrated circuit terminal 404 is an output terminal for providing the DRV signal.

Off-time control circuit 410 has a first input connected to integrated circuit terminal 401, a second input, and an output. Valley selection and VCO control circuit 420 has an input connected to integrated circuit terminal 402, and an output connected to the second input of off-time control circuit 410. Feedback divider circuit 430 has an input connected to integrated circuit terminal 402 for receiving the feedback signal, and an output for providing a feedback voltage that is related to the feedback signal according to an associated divider labeled "$K_{FB}$". LEB circuit 440 has an input connected to integrated circuit terminal 403, and an output.

On-time control circuit 450 includes a comparator 451, a comparator 452, an AND gate 453, and a voltage source 454. Comparator 451 has a positive input connected to the output of LEB circuit 440, a negative input connected to the output of feedback divider circuit 430, and an output. Comparator 452 has a positive input connected to the output of LEB circuit 440, a negative input, and an output. AND gate 453 has a first input connected to the output of comparator 451, a second input connected to the output of comparator 452, and an output. Voltage source 454 has a positive terminal connected to the negative input of comparator 452, and a negative terminal connected to primary ground, and has an associated voltage labeled "$V_{CS(MIN)}$".

SR latch 460 has a set input labeled "S" connected to the output of off-time control circuit 410, a reset input labeled "R" connected to the output of AND gate 453, and an output. Driver 470 has an input connected to the output of SR latch 460, and an output connected to integrated circuit terminal 404.

In operation, QR controller 400 determines the ON time and the OFF time of the DRV signal as follows. When it detects a particular valley using the ZCD signal, off-time control circuit 410 activates its output to set SR latch 460, causing the Q output to go high for driver 470 to provide the DRV signal at an active high level. On-time control circuit 450 then determines when to reset the latch as follows. A comparator 451 compares the current sensed by the CS input to the feedback voltage, and provides a high voltage at it output when the CS input exceeds the feedback voltage.

QR controller 400 includes valley selection and VCO control circuit 420 to select increasing valleys as the feedback signal decreases. When the load lightens beyond a certain point, it starts to reduce the switching frequency in a voltage controlled oscillator, or "VCO" mode. This operation will now be described graphically.

Figure 5:
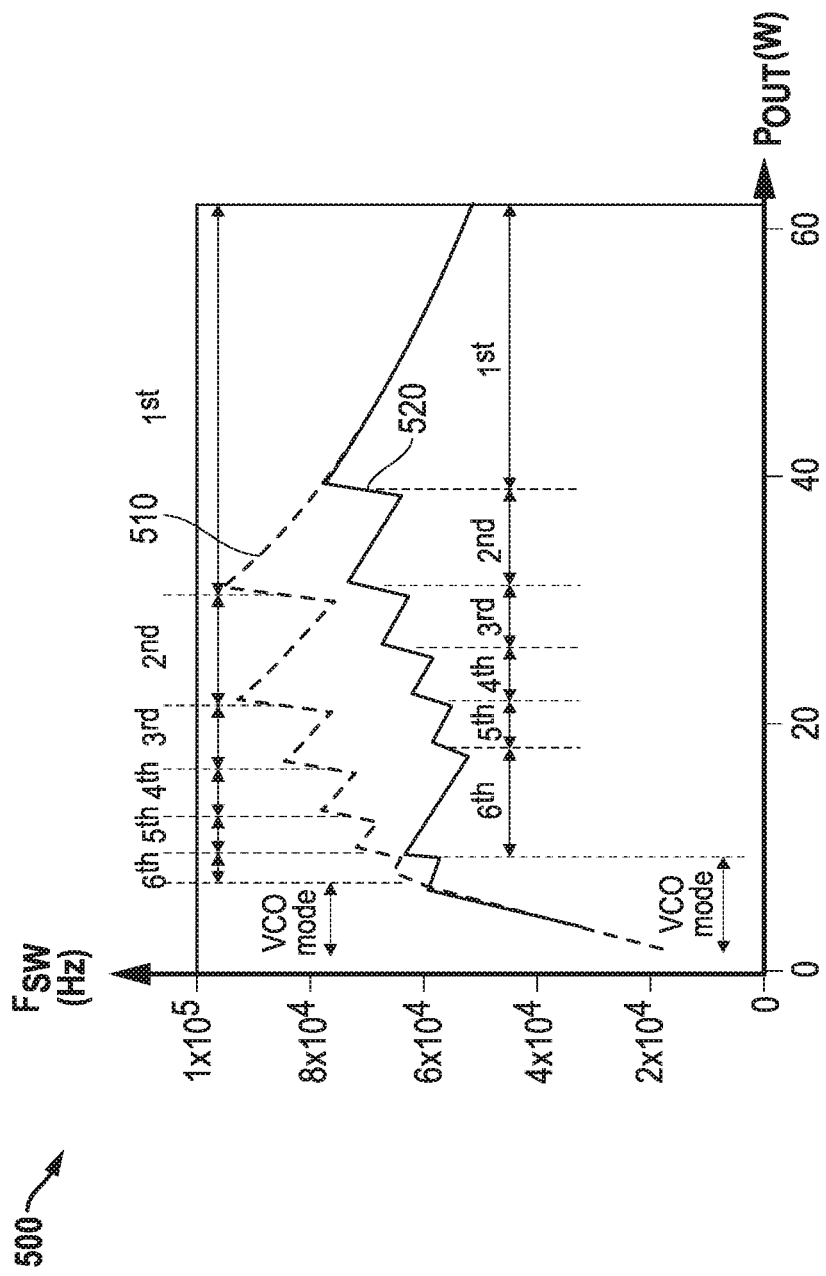
FIG. 5 illustrates a graph showing valley selection and light-load operation with changes in the load of the QR controller of FIG. 4.

FIG. 5 illustrates a graph 500 showing valley selection and light-load operation with changes in the load of QR controller 400 of FIG. 4. In graph 500, the horizontal axis represents output power in watts (W), and the vertical axis represents switching frequency in Hz. Graph 500 shows two waveforms of interest, a waveform 510 that represents the switching between valleys as the load lightens, and a waveform 520 that represents the switching between valleys as the load gets heavier. Associated with each waveform is a range of valleys. For example in waveform 510, the switching frequency naturally increases as the load lightens in the first valley from about 50 KHz for output power of about 63 W to about 95 kHz at about 52 W.

Graph 500 shows an exemplary embodiment of a switching frequency profile of a QR converter operating with six valleys that transitions to VCO mode with frozen minimum peak current. This exemplary method of VCO mode may be used to enable the QR flyback converter to operate with acceptable efficiencies at lighter loads.

The operating frequency range of QR flyback converters, however, may be increased to higher switching frequencies and some QR flyback converters that use VCO mode with Frozen Peak Current may have difficulty achieving the regulatory efficiency requirements at lighter loads. For example, the added dead-time at the 25% and 10% load points may not be enough to sufficiently reduce the switching frequency to enable efficient operation. What is needed, then, is a mechanism to improve the frequency range.

Figure 6:
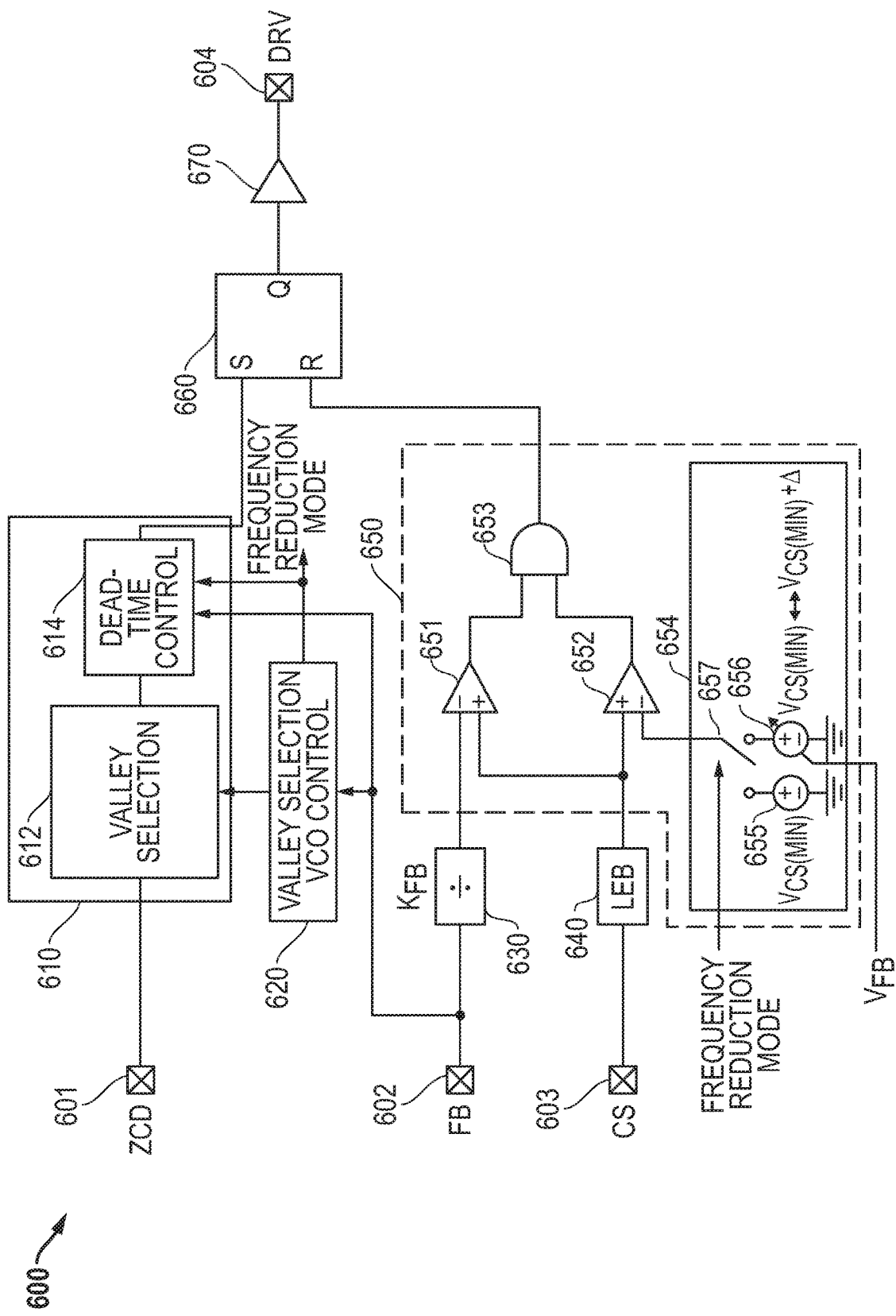
FIG. 6 illustrates in block diagram form a QR controller suitable for use in the QR converter of FIG. 1 according to embodiments of the present disclosure.

FIG. 6 illustrates in block diagram form a QR controller 600 suitable for use in the QR converter of FIG. 1 according to embodiments of the present disclosure. QR controller 600 includes an integrated circuit terminal 601, an integrated circuit terminal 602, an integrated circuit terminal 603, an integrated circuit terminal 604, an off-time control circuit 610, a valley selection and VCO control circuit 620, a feedback divider circuit 630, an LEB circuit 640, an on-time control circuit 650, an SR latch 660, a driver 670.

Integrated circuit terminal 601 is an input terminal for receiving the ZCD signal. Integrated circuit terminal 602 is an input terminal for receiving the FB signal. Integrated circuit terminal 603 is an input terminal for receiving the CS signal. Integrated circuit terminal 604 is an output terminal for providing the DRV signal.

Off-time control circuit 610 includes a valley selection circuit 612 and a dead-time control circuit 614. Valley selection circuit 612 has a first input connected to integrated circuit terminal 601, a second input, and an output. Dead-time control circuit 614 has a first input connected to the output of valley selection circuit 612, a second input connected to integrated circuit terminal 602, a third input, and an output. Valley selection and VCO control circuit 620 has an input connected to integrated circuit terminal 602, a first output connected to the second input of valley selection circuit 612, and a second output connected to the third input of dead-time control circuit 614 for providing a signal labeled "FREQUENCY REDUCTION MODE". Feedback divider circuit 630 has an input connected to integrated circuit terminal 602, and an output, and has an associated divider $K_{FB}$. LEB circuit 640 has an input connected to integrated circuit terminal 403, and an output.

On-time control circuit 650 includes a comparator 651, a comparator 652, an AND gate 653, and a peak current modulator 654. Comparator 651 has a positive input connected to the output of LEB circuit 640, a negative input connected to the output of feedback divider circuit 630, and an output. Comparator 652 has a positive input connected to the output of LEB circuit 640, a negative input, and an output. AND gate 653 has a first input connected to the output of comparator 651, a second input connected to the output of comparator 652, and an output. Peak current modulator 654 includes a voltage source 655, a variable voltage source 656, and a switch 657. Voltage source 655 has a positive terminal, and a negative terminal connected to primary ground, and provides a voltage labeled "$V_{CS(MIN)}$" between the first and second terminals thereof. Voltage controlled voltage source 656 has a positive terminal, and a negative terminal connected to primary ground, and a control terminal connected to integrated circuit terminal 602 for receiving the FB signal. Switch 657 has a first terminal, a second terminal alternatively connected to the first terminal of voltage source 655 and the first terminal of voltage controlled voltage source 656, and a control terminal for receiving the FREQUENCY REDUCTION MODE signal.

SR latch 660 has an S input connected to the output of dead-time control circuit 614, an R input connected to the output of AND gate 653, and an output Q. Driver 670 has an input connected to the output of SR latch 660, and an output connected to integrated circuit terminal 604.

QR controller 600 uses a technique for improving the light load performance of high frequency QR flyback converters according to various embodiments disclosed herein. The technique involves manipulation of the "frozen" peak current set-point such that QR controller 600 may be forced to operate at a lower switching frequency upon entering the frequency reduction operating mode. In some embodiments, the converter may operate at a significantly lower frequency immediately upon entering frequency reduction mode. In the illustrated embodiment, rather than freezing the peak transformer current to the value at which QR controller 600 enters frequency reduction mode, on-time control circuit 650 modulates the peak current value by increasing it to a value greater than the one at which frequency reduction mode is entered.

In particular, switch 657 selects the output of voltage source 655 when the FREQUENCY REDUCTION MODE signal is inactive, indicating operation in the valley switching mode when $V_{FB}$ is between a voltage labeled "$V_3$" and a voltage labeled "$V_2$". Voltage source 655 outputs a fixed voltage equal to $V_{CS(MIN)}$, which corresponds to a peak current base value.

Switch 657 selects the output of voltage controlled voltage source 656 when the FREQUENCY REDUCTION MODE signal is active, indicating operation in the frequency reduction mode. Voltage controlled voltage source 656 also outputs a voltage that varies based on the value of the FB signal. In particular, voltage controlled voltage source 656 reduces its output voltage linearly with reductions in the size of load 168 as indicated by the FB signal between $V_2$ and a voltage labeled "$V_1$". At $V_2$, the output of voltage controlled voltage source 656 is equal to the peak current base value plus a predetermined amount labeled "Δ", at $V_1$ its output is equal to $V_{CS(MIN)}$, and at points in between at corresponding voltages along the $V_1$–$V_2$ line segment. Thus when the load lightens such that switched mode power supply controller 600 transitions between the valley switching mode and the frequency reduction mode, it increases the modulated peak current limit by Δ.

Increasing the peak current limit may force the converter's feedback loop to reduce the switching frequency in order to compensate for the higher peak current. This operation may result in a substantial but natural decrease in switching frequency without any oscillatory behavior and may reduce the switching frequency enough to achieve the desired efficiency.

In some embodiments of frequency reduction mode, the modulated peak current may be frozen at the value that the converter enters frequency reduction mode. Freezing the modulated peak current allows for direct control of the switching frequency to achieve the required output power provided to the load and may allow the converter to achieve a lower switching frequency for a given load requirement. In some embodiments during light load operation, where the switching losses may become the dominant loss mechanism in the converter, operating at a lower switching frequency for a given load may result in a higher efficiency at that load.

Figure 7:
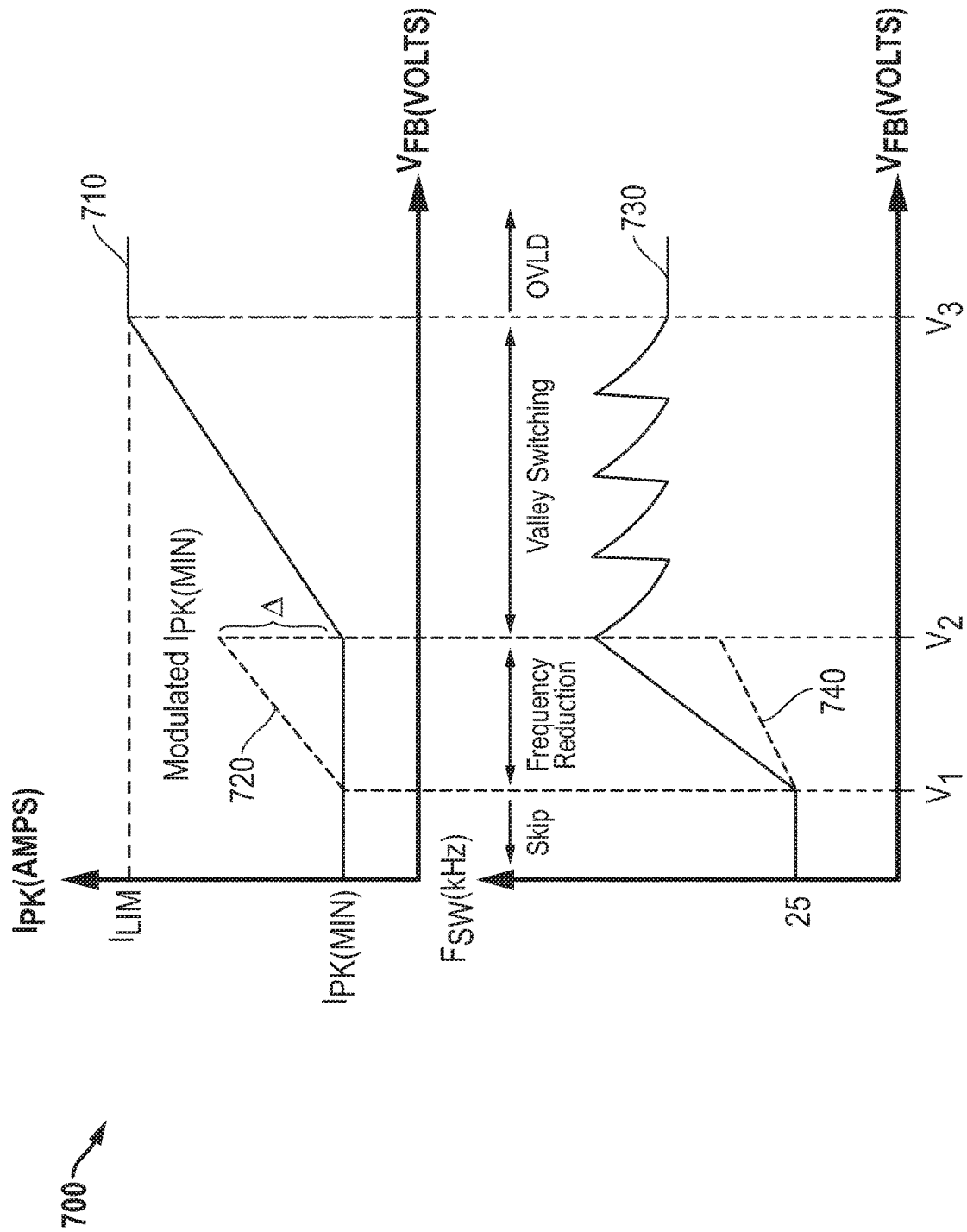
FIG. 7 illustrates a graph showing valley selection and light-load operation with changes in the load of the QR converter of FIG. 1 when using the QR controller of FIG. 6.

FIG. 7 illustrates a graph 700 showing valley selection and light-load operation with changes in the load of QR converter 100 of FIG. 1 when using QR controller 600 of FIG. 6. In graph 700, the horizontal axis represents the level of feedback signal $V_{FB}$ in volts. Graph 700 includes a waveform 710 representing peak current $I_{PK}$, having a vertical axis that represents $I_{PK}$ in amperes (amps), and a waveform 730 having a vertical axis that represents switching frequency $F_{SW}$ in kilohertz (kHz). Graph 700 shows three voltages of interest, labeled "$V_1$", "$V_2$", and "$V_3$". When $V_{FB}$ is above $V_3$, QR controller 600 is in an overload (OVLD) condition and the frequency is clamped. As $V_{FB}$ decreases between $V_3$ and $V_2$, QR controller 600 operates in valley switching mode. Between $V_2$ and $V_1$, QR controller 600 operates in frequency reduction mode. Below $V_1$, QR controller 600 operates in cycle skip mode in which the frequency is clamped at a frequency above the human-audible range. In the example shown in FIG. 7, this frequency is 25 kHz.

As shown by waveform 710, as the load lightens between $V_3$ and $V_2$, $I_{PK}$ decreases linearly and continuously between a current limit value labeled "$I_{LIM}$" and a minimum value labeled "$I_{PK(MIN)}$". As $V_{FB}$ decreases below $V_2$, however, QR controller 600 modulates the peak current by increasing $I_{PK}$ to $I_{PK(MIN)}+\Delta$ as shown in waveform segment 720. Between $V_2$ and $V_1$, the modulated $I_{PK(MIN)}$ and $I_{PK}$ decrease linearly as a function of $V_{FB}$ until $V_{FB}=V_1$. Below $V_1$, the modulated $I_{PK(MIN)}$ remains at $I_{PK(MIN)}$.

As shown by waveform 730, in valley switching mode between $V_3$ and $V_2$ QR controller 600 supports four valleys and as the load lightens in each valley, $F_{SW}$ increases but then decreases in step-wise fashion at the start of the next valley. As $V_{FB}$ decreases below $V_2$, however, QR controller 600 modulates the peak current by increasing $I_{PK(MIN)}$ to $I_{PK(MIN)}+\Delta$ as shown in waveform segment 720. The step increase of the modulated $I_{PK(MIN)}$ at $V_2$ shown in waveform segment 720 forces a step-wise reduction in $F_{SW}$ as shown by waveform segment 740. $F_{SW}$ continues to decrease in frequency as $V_{FB}$ reduces between $V_2$ to $V_1$.

Figure 8:
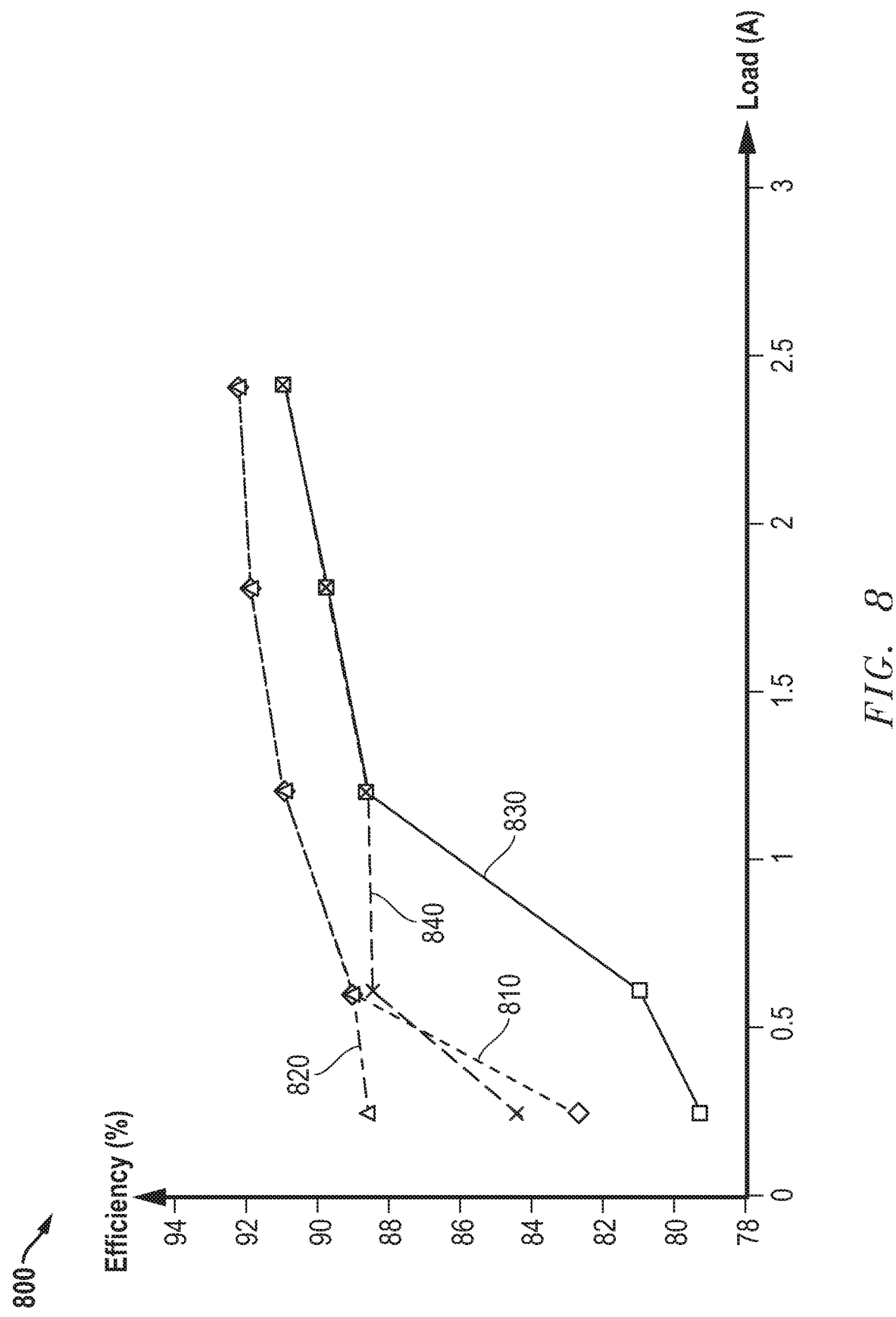
FIG. 8 illustrates a graph showing converter efficiency versus load of the QR converter of FIG. 1 when using the QR controller of FIG. 4 and the QR controller of FIG. 6.

FIG. 8 illustrates a graph 800 showing converter efficiency versus load of QR converter 100 of FIG. 1 when using QR controller 400 of FIG. 4 and QR controller 600 of FIG. 6. In graph 800, the horizontal axis represents load in amperes (A), and the vertical axis represents converter efficiency, in percent. Five different load points are used to represent the load range: about 0.25 A, about 0.6 A, about 1.2 A, about 1.8 A, and about 2.4 A, corresponding to about 10%, 25%, 50%, 75%, and 100%, respectively, of full load.

A waveform 810 shows the efficiency of QR controller 400 when operated at low line, e.g. $V_{IN}$=115 V RMS. As can be seen, efficiency is relatively high at 100%, 75%, and 50%, but drops significantly below the 25% load point. A waveform 820 shows the efficiency of QR controller 600 when operated at low line. Waveform 820 is coincident with waveform 810 for the 100%, 75%, 50%, and 25% load points, but remains substantially flat between the 25% and 10% load point loads, showing about 88.5% efficiency compared to about 82.7% efficiency for QR controller 400 at 10% of full load.

A waveform 830 shows the efficiency of QR controller 400 when operated at high line, e.g. $V_{IN}$=230 V RMS. As can be seen, efficiency is relatively high at 100%, 75%, and 50% of full load, but drops significantly for loads below 50%. A waveform 840 shows the efficiency of QR controller 600 when operated at high line. Waveform 840 is coincident with waveform 830 for the 100%, 75%, and 50% load points, remains substantially flat between 50% and 25%, and decreases but remains well above waveform 830 between 25% and 10%.

In off-line AC-DC consumer applications, the Department of Energy (DOE) in the United States and the Code of Conduct (CoC) on Energy Efficiency of the European Union have posed stringent regulations on no-load power (standby power) and operating efficiency across various output loads. The improvements in light-load efficiency provided by QR controller 600 can be used to better meet these and other governmental efficiency requirements.

The above-disclosed subject matter is to be considered illustrative, and not restrictive, and the appended claims are intended to cover all such modifications, enhancements, and other embodiments that fall within the true scope of the claims. For example, while FIG. 6 showed one embodiment of a peak current modulator, other implementations are possible. Moreover an integrated circuit switched mode power supply controller may have more integrated circuit terminals than the ones shown herein, with other modes and protection mechanisms. Many of these other modes and protection mechanisms would be known to those skilled in the art. Also the disclosed on-time control circuit divided the feedback signal by a feedback divider to scale the feedback signal to a voltage compatible with the current sense signal. In other embodiments, either or both of the feedback signal and the current sense signal can be scaled to achieve the desired control.

Thus, to the maximum extent allowed by law, the scope of the present invention is to be determined by the broadest permissible interpretation of the following claims and their equivalents, and shall not be restricted or limited by the foregoing detailed description.

What is claimed is:

1. A switched mode power supply controller, comprising:
   a latch having an output for providing a drive signal;
   an off-time control circuit operating in one of a valley switching mode and a frequency reduction mode based on a size of a load, wherein in said valley switching mode, said off-time control circuit initiates a switching cycle synchronized to a resonant valley, and in said frequency reduction mode, said off-time control circuit initiates a subsequent switching cycle after an off-time dependent on the size of the load, said off-time control circuit controlling an off-time of said latch based on at least a zero current detect signal; and an on-time control circuit for resetting said latch in response to a current sense signal exceeding a feedback voltage representative of said load and to said current sense signal exceeding a peak current threshold value, wherein in said frequency reduction mode, said on-time control circuit modulates said peak current threshold value by increasing said peak current threshold value by a predetermined amount when the switched mode power supply controller changes from said valley switching mode to said frequency reduction mode, and reducing said peak current threshold value as the load decreases further while in said frequency reduction mode.

2. The switched mode power supply controller of claim 1, further wherein:

in said valley switching mode, said on-time control circuit keeps said peak current threshold value equal to a peak current base; and in said frequency reduction mode, said on-time control circuit modulates said peak current threshold value by increasing said peak current threshold value by said predetermined amount when changing from said valley switching mode to said frequency reduction mode, and reducing said peak current threshold value between said peak current base plus said predetermined amount and said peak current base.

3. The switched mode power supply controller of claim 1, further comprising:

a mode control circuit that selectively places the switched mode power supply controller into one of said valley switching mode and said frequency reduction mode based on a value of a feedback signal.

4. The switched mode power supply controller of claim 3, wherein:

said mode control circuit further selects one of a plurality of valleys of said zero current detect signal in said valley switching mode in response to said value of said feedback signal.

5. The switched mode power supply controller of claim 1, wherein:

said off-time control circuit further controls said off-time of said latch based on both said zero current detect signal and a level of a feedback signal in said frequency reduction mode, wherein said feedback voltage is proportional to said feedback signal.

6. The switched mode power supply controller of claim 1, further comprising:

a mode control circuit having an input for receiving a feedback signal, and an output for providing a frequency reduction mode signal in response to said feedback signal being between first and second voltages, wherein said feedback voltage is proportional to said feedback signal.

7. The switched mode power supply controller of claim 6, wherein said on-time control circuit comprises:

a pulse width modulator (PWM) comparator having a positive input for receiving said current sense signal, a negative input for receiving said feedback voltage, and an output;

a peak current comparator having a positive input for receiving said current sense signal, a negative input for receiving said peak current threshold value, and an output an AND gate having a first input coupled to said output of said PWM comparator, a second input coupled to said output of said peak current comparator, and an output for providing a latch off signal to said latch; and a peak current modulator having a first input for receiving frequency reduction mode signal, a second input for receiving said feedback signal, and an output for providing said peak current threshold value.

8. A switched mode power supply, comprising:

a transformer having a primary winding, a secondary winding, and an auxiliary winding;

a power transistor having a first current electrode coupled to said primary winding, a control electrode for receiving a drive signal, and a second current electrode;

a current sense element having a first terminal coupled to said second current electrode of said power transistor for providing a current sense signal, and a second current electrode coupled to a ground terminal;

an output circuit coupled to said secondary winding for providing a regulated output to a load;

a first feedback circuit coupled to said auxiliary winding of said transformer for providing a zero current detect signal representative of a magnetization state of said transformer;

a second feedback circuit coupled to said output circuit for providing a feedback signal representative of said load; and a switched mode power supply controller comprising:

a latch having an output for providing said drive signal;

an off-time control circuit operating in one of a valley switching mode and a frequency reduction mode based on a size of a load, wherein in said valley switching mode, said off-time control circuit initiates a switching cycle synchronized to a resonant valley, and in said frequency reduction mode, said off-time control circuit initiates a subsequent switching cycle after an off-time dependent on the size of the load, said off-time control circuit controlling an off-time of said latch based on said zero current detect signal; and an on-time control circuit for resetting said latch in response to said current sense signal exceeding a feedback voltage representative of a load and to said current sense signal exceeding a peak current threshold value, wherein in said frequency reduction mode, said on-time control circuit modulates said peak current threshold value by increasing said peak current threshold value by a predetermined amount when the switched mode power supply controller changes from said valley switching mode to said frequency reduction mode, and reducing said peak current threshold value as the load decreases further while in said frequency reduction mode.

9. The switched mode power supply of claim 8, further wherein:

in said valley switching mode, said on-time control circuit keeps said peak current threshold value equal to a peak current base; and in said frequency reduction mode, said on-time control circuit modulates said peak current threshold value by increasing said peak current threshold value by said predetermined amount when changing from said valley switching mode to said frequency reduction mode, and reducing said peak current threshold value between said peak current base plus said predetermined amount and said peak current base.

10. The switched mode power supply of claim 8, further comprising:

a mode control circuit that selectively places the switched mode power supply controller into said valley switching mode and said frequency reduction mode based on a value of said feedback signal.

11. The switched mode power supply of claim 10, wherein:
said mode control circuit further selects one of a plurality of valleys of said zero current detect signal in said valley switching mode in response to said value of said feedback signal.

12. The switched mode power supply of claim 8, wherein:
said latch, said off-time control circuit, and said on-time control circuit are combined in a monolithic integrated circuit.

13. The switched mode power supply of claim 12, wherein:
said monolithic integrated circuit comprises a current sense terminal; and
the switched mode power supply controller further includes a leading edge blanking circuit having an input coupled to said current sense terminal, and an output for providing said current sense signal.

14. The switched mode power supply of claim 8, further comprising:
a mode control circuit having an input for receiving said feedback signal, and an output for providing a frequency reduction mode signal in response to said feedback signal being between first and second voltages.

15. The switched mode power supply of claim 14, wherein said on-time control circuit comprises:
a pulse width modulator (PWM) comparator having a positive input for receiving said current sense signal, a negative input for receiving said feedback voltage, and an output;
a peak current comparator having a positive input for receiving said current sense signal, a negative input for receiving said peak current threshold value, and an output;
an AND gate having a first input coupled to said output of said PWM comparator, a second input coupled to said output of said peak current comparator, and an output for providing a latch off signal to said latch; and
a peak current modulator having a first input for receiving frequency reduction mode signal, a second input for receiving said feedback signal, and an output for providing said peak current threshold value.

16. The switched mode power supply of claim 14, wherein:
said switched mode power supply controller comprises a feedback terminal for receiving said feedback signal, wherein said feedback voltage is proportional to said feedback signal.

17. The switched mode power supply of claim 14, wherein:
said off-time control circuit further controls said off-time of said latch based on both said zero current detect signal and a level of said feedback signal in said frequency reduction mode.

18. A method for operating a switched mode power supply, comprising:
selectively operating the switched mode power supply in one of a valley switching mode and a frequency reduction mode based on a size of a load;
setting a latch based on a zero current detect signal that indicates a demagnetization state of a magnetic element in said valley switching mode;
setting said latch after an off-time dependent on the size of the load in said frequency reduction mode;
resetting said latch in response to a current sense signal that indicates a current flowing through a power transistor coupled to said magnetic element exceeding a feedback voltage representative of a load and to said current sense signal exceeding a peak current threshold value; and
modulating said peak current threshold value by increasing said peak current threshold value in said frequency reduction mode by a predetermined amount when the switched mode power supply changes from said valley switching mode to said frequency reduction mode, and reducing said peak current threshold value as the load decreases further while in said frequency reduction mode.

19. The method of claim 18, further comprising:
keeping said peak current threshold value equal to a peak current base in said valley switching mode; and
modulates said peak current threshold value in said frequency reduction mode by increasing said peak current threshold value by said predetermined amount when changing from said valley switching mode to said frequency reduction mode, and reducing said peak current threshold value between said peak current base plus said predetermined amount and said peak current base.

20. The method of claim 18, wherein:
operating the switched mode power supply in one of said valley switching mode and said frequency reduction mode comprises selecting said valley switching mode and said frequency reduction mode based on a value of a feedback signal, wherein said feedback voltage is proportional to said feedback signal.

21. The method of claim 18, comprising:
setting said latch further comprises setting said latch based on said zero current detect signal and a dead-time proportional to a feedback signal in said frequency reduction mode, wherein said feedback voltage is proportional to said feedback signal.

* * * * *